(12) United States Patent
Heren et al.

(10) Patent No.: US 8,240,143 B2
(45) Date of Patent: Aug. 14, 2012

(54) HYDRAULIC ENERGY RECOVERY SYSTEM

(75) Inventors: Jean Heren, Margny les Compiegne (FR); Gilles Lemaire, Margny les Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 798 days.

(21) Appl. No.: 12/307,167

(22) PCT Filed: Jul. 2, 2007

(86) PCT No.: PCT/FR2007/051574
§ 371 (c)(1), (2), (4) Date: Dec. 31, 2008

(87) PCT Pub. No.: WO2008/003896
PCT Pub. Date: Jan. 10, 2008

(65) Prior Publication Data
US 2009/0313985 A1    Dec. 24, 2009

(30) Foreign Application Priority Data

Jul. 3, 2006  (FR) ..................................... 06 52763
Aug. 7, 2006 (FR) ..................................... 06 53305

(51) Int. Cl.
*F16H 61/40* (2010.01)
*B60K 5/12* (2006.01)

(52) U.S. Cl. .......................................... 60/418; 60/414
(58) Field of Classification Search .................... 92/414, 92/418
See application file for complete search history.

(56) References Cited

U.S. PATENT DOCUMENTS

| | | | |
|---|---|---|---|
| 4,204,405 A | 5/1980 | Basham | |
| 4,754,603 A | 7/1988 | Rosman | |
| 6,170,587 B1 * | 1/2001 | Bullock | ..................... 180/69.6 |
| 2005/0178115 A1 * | 8/2005 | Hughey | ........................ 60/413 |

FOREIGN PATENT DOCUMENTS

| | | |
|---|---|---|
| EP | 1 433 648 A2 | 6/2004 |
| WO | 98/47732 A1 | 10/1998 |

OTHER PUBLICATIONS

International Search Report; PCT/FR2007/051574.

* cited by examiner

*Primary Examiner* — Thomas E Lazo
(74) *Attorney, Agent, or Firm* — Ladas & Parry LLP

(57) ABSTRACT

A circuit having at least one hydraulic motor, two main ducts for feeding or discharging the at least one motor, a low-pressure fluid source, and a high-pressure accumulator forming a high-pressure fluid source. The circuit is suitable for operating in an energy recovery mode in which the feed main duct is connected to the low-pressure fluid source and the discharge main duct is connected to the high-pressure accumulator, and in an energy delivery mode in which the connections are inverted. The low-pressure fluid source has a high-flow-rate booster pump suitable for delivering a flow-rate of fluid that is sufficient to feed fluid to the at least one hydraulic motor while the motor is at maximum speed in energy recovery mode, and an adjustable pressure limiter suitable for being controlled so as to cause the pressure of the fluid at the outlet of the low-pressure fluid source to vary.

14 Claims, 11 Drawing Sheets

HYDRAULIC ENERGY RECOVERY SYSTEM

BACKGROUND OF THE INVENTION

The present invention relates to a hydraulic circuit for recovering energy, which circuit comprises at least one hydraulic motor, two main ducts for feeding or discharging said at least one motor, a low-pressure fluid source, and a high-pressure accumulator forming a high-pressure fluid source, the circuit being suitable for operating in energy recovery mode in which the feed main duct is connected to the low-pressure fluid source and the discharge main duct is connected to the high-pressure accumulator, and in energy delivery mode in which the feed main duct is connected to the high-pressure accumulator and the discharge main duct is connected to the low-pressure fluid source.

It is known that such circuits can be fitted to vehicles for the purpose of limiting energy consumption. Such vehicles are "hybrid" vehicles, each such vehicle having a conventional propulsion engine (e.g. of the internal combustion engine type) and a circuit of the above-mentioned type in which the hydraulic motor(s) can be coupled mechanically to the propulsion device, e.g. by being coupled to the drive outlet of said device, or indeed to a wheel of the vehicle. At cruising speed, the vehicle is normally driven by its conventional propulsion engine. Energy recovery takes place during braking, during which the hydraulic motor is driven by the propulsion of the vehicle that is being braked, so that said hydraulic motor operates as a pump and feeds the high-pressure accumulator with fluid. Energy delivery takes place in particular during an acceleration phase, during which the vehicle is accelerating and during which the hydraulic motor is activated once again and is fed with high-pressure fluid coming from the accumulator, so as to deliver drive torque for assisting propulsion of the vehicle.

Such "hybrid" systems are known to be advantageous in reducing fuel consumption.

Conventionally, a low-pressure accumulator is used as the low-pressure fluid source. Unfortunately, the shape and the size of such a low-pressure accumulator can pose compactness problems.

It is possible to choose a booster pump as the low-pressure fluid source, the feed of the booster pump then being connected to a reservoir at atmospheric pressure, which reservoir is relatively little constrained as to its shape and is therefore easier to incorporate into the vehicle. The booster pump is dimensioned to perform optimum boosting of the cylinders of the hydraulic motor(s) during energy recovery, while the flow rate is at its maximum. Such pumps are conventionally of fixed rating, i.e. they are associated with a pressure limiter having fixed setpoint, limiting the delivered pressure to a single predetermined value.

The hydrostatic braking torque achieved by the hydraulic motor(s) during an energy recovery phase and the drive torque delivered by said motor(s) during an energy delivery phase is equal to the product of the cubic capacity of the motor multiplied by the difference between the high pressure of the high-pressure accumulator and the boosting low pressure of the pump. Said high pressure is determined by the accumulator, as a function of its level of charge, while, as indicated above, said low pressure is set by the fixed rating of the pump. In addition, if the cubic capacity of the motor is fixed, it is not possible to adjust the hydrostatic braking torque or the drive torque to match real needs.

In order to avoid braking that is too sudden during an energy recovery phase, or drive assistance that is too sudden during an energy delivery phase, the hydraulic motor(s) tend(s) to be overdimensioned, and the outlet torque therefrom is therefore relatively limited.

As a result, the possibilities of storing fluid during an energy recovery phase and the possibilities of delivering drive assistance during an energy delivery phase are relatively limited, which naturally adversely affects the efficiency of the circuit and thus the overall performance thereof. In other words, the reduction in fuel consumption is not optimized.

Naturally, when it is a low-pressure accumulator that is used as a low-pressure fluid source, the above-mentioned difficulties are also encountered, because the low pressure is then determined by the low-pressure accumulator, without any possibility of adjustment.

An object of the present invention is to remedy those drawbacks or, at least, to attenuate them significantly.

This object is achieved by the fact that the low-pressure fluid source comprises a high-flow-rate booster pump suitable for delivering, from a pressure-free reservoir, a flow-rate of fluid that is sufficient to feed fluid to said at least one hydraulic motor while said motor is at maximum speed in energy recovery mode, and an adjustable pressure limiter suitable for being controlled so as to cause the pressure of the fluid at the low-pressure fluid source to vary.

It can be understood that, by causing the low-pressure of the fluid of the low-pressure fluid source to vary by means of the adjustable pressure limiter, it is possible for the torque of the motor to be varied even if the cubic capacity of said motor is fixed, it being recalled that said torque is the product of said cubic capacity multiplied by the difference between the high pressure and the low pressure. The fact that the pressure limiter is adjustable means that it is a progressive valve, whose position can be adjusted finely as a function of the pressure needs. Thus, the adjustable pressure limiter makes it possible, regardless of the type of hydraulic motor used, to set the low pressure to a level necessary for adjusting the drive torque and for avoiding cavitation, both in an energy recovery phase and in an energy delivery phase.

For example, during an energy recovery phase, it is possible to choose to set the outlet pressure of the low-pressure fluid source to a level necessary for feeding the hydraulic motor(s) (the speed of which is determined by the conventional propulsion of the vehicle) without cavitation, thereby enabling the motor(s) to pump a maximum quantity of fluid so as to optimize recharging of the high-pressure accumulator. During the energy delivery phase, it is possible to choose to set the low pressure to a minimum level so as to obtain high assistance torque.

Advantageously, the circuit further comprises means for activating or deactivating the high-flow-rate booster pump, which means are preferably associated with a check valve preventing fluid from returning towards said pump.

This makes it possible to consume the energy necessary for driving the pump only when said pump is useful for recovering energy, allowing said pump to be deactivated otherwise.

Advantageously, the circuit further comprises means for detecting at least one indicator parameter that indicates the state of the circuit, and for controlling the adjustable pressure limiter as a function of said at least one parameter. For example, said indicator parameter comprises the level of charge of the high-pressure accumulator.

These features make it possible to adjust the low pressure more finely so as to adjust the braking torque or the assistance drive torque to match the real need, as indicated by the above-mentioned parameter.

For example, in energy recovery mode, the high pressure of the circuit, which pressure is the pressure necessary for filling the high-pressure accumulator, increases with increasing level of charge thereof. Without adjusting the low pressure, the braking torque thus increases with the level of charge of the accumulator. This is not always desirable, in particular because such an increase might occur at the end of a vehicle braking phase, even though the speed of the vehicle has already decreased very significantly, so that constant braking torque would suffice.

By means of the above-mentioned features, it is possible, conversely, to increase the outlet pressure of the low-pressure fluid source at the same time as the pressure of the high-pressure accumulator increases, so as to stabilize the braking torque.

Advantageously, the circuit further comprises means for controlling the adjustable pressure limiter as a function of an operating setpoint for operation of said at least one hydraulic motor. For example, the operating setpoint relates to the outlet torque of said at least one motor.

This makes it possible, in particular, to cause the motor(s) to operate in energy recovery mode so as to recharge the high-pressure accumulator, while the braking torque demand is low, and, symmetrically, to set the assistance drive torque so as to avoid jolting in the propulsion and, and to cause the motor(s) to operate in energy delivery mode, even when torque demand is not very high. It is thus possible to increase the opportunities for using hydraulic assistance, thereby further reducing the fuel consumption of the conventional propulsion.

BRIEF DESCRIPTION OF THE DRAWING FIGURES

The invention can be well understood and its advantages appear more clearly on reading the following detailed description of embodiments shown by way of non-limiting example. The description refers to the accompanying drawings in which.

Figure 1A:
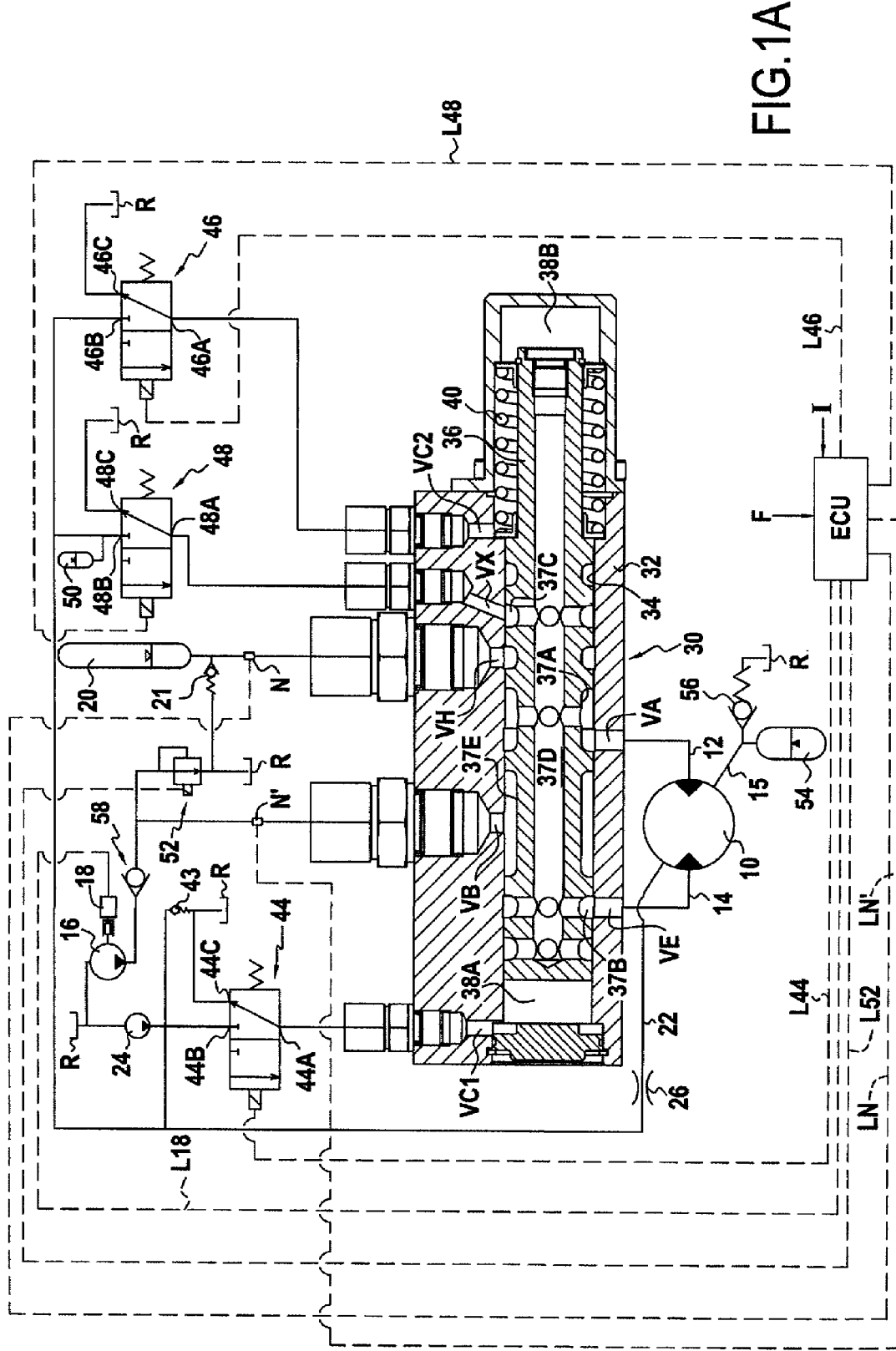
FIG. 1A shows a first embodiment of a hydraulic circuit of the invention, in a standby configuration.
Figure 1B:
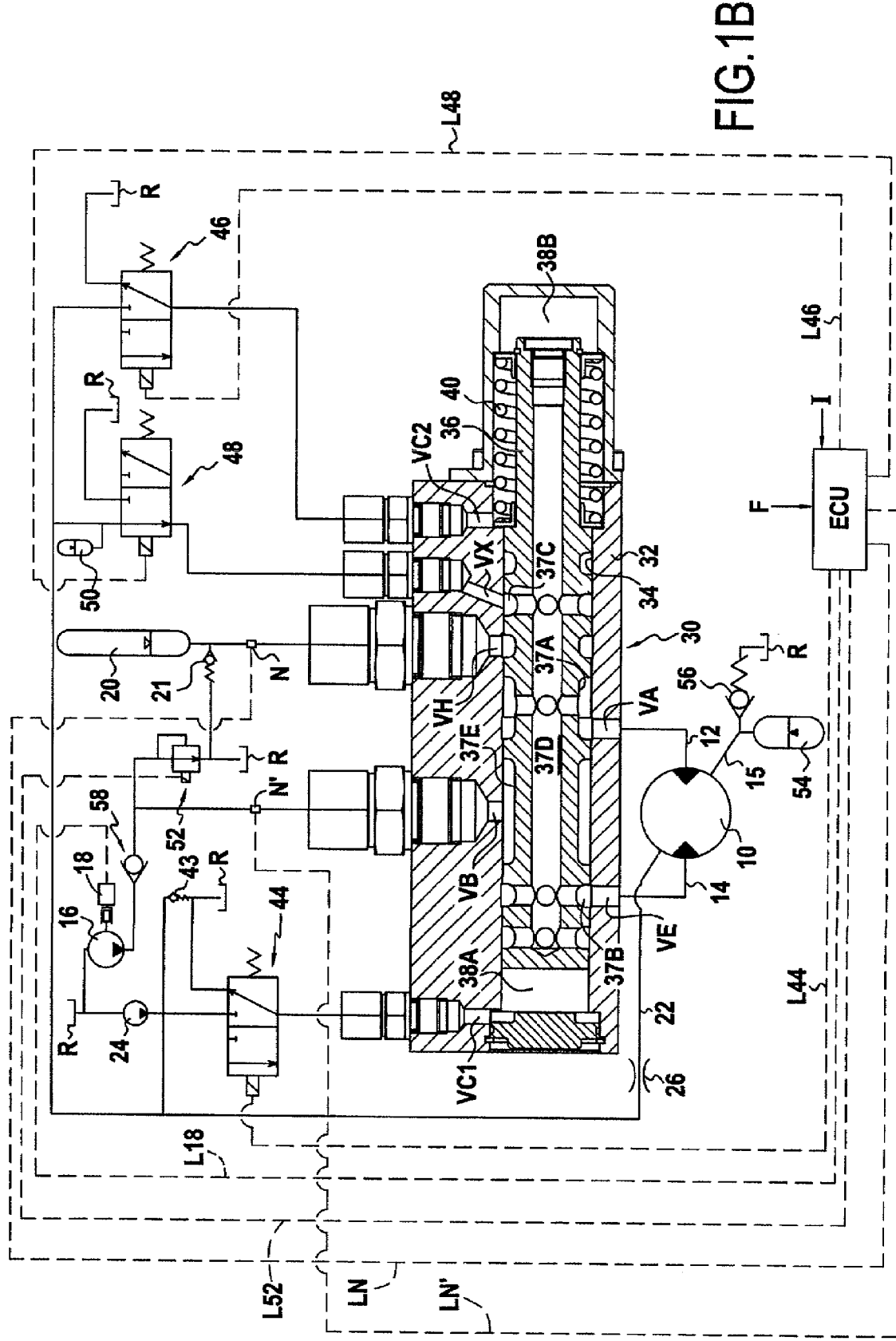
FIG. 1B shows the same circuit, in an intermediate phase between the standby configuration and energy recovery mode or energy delivery mode.
Figure 1C:
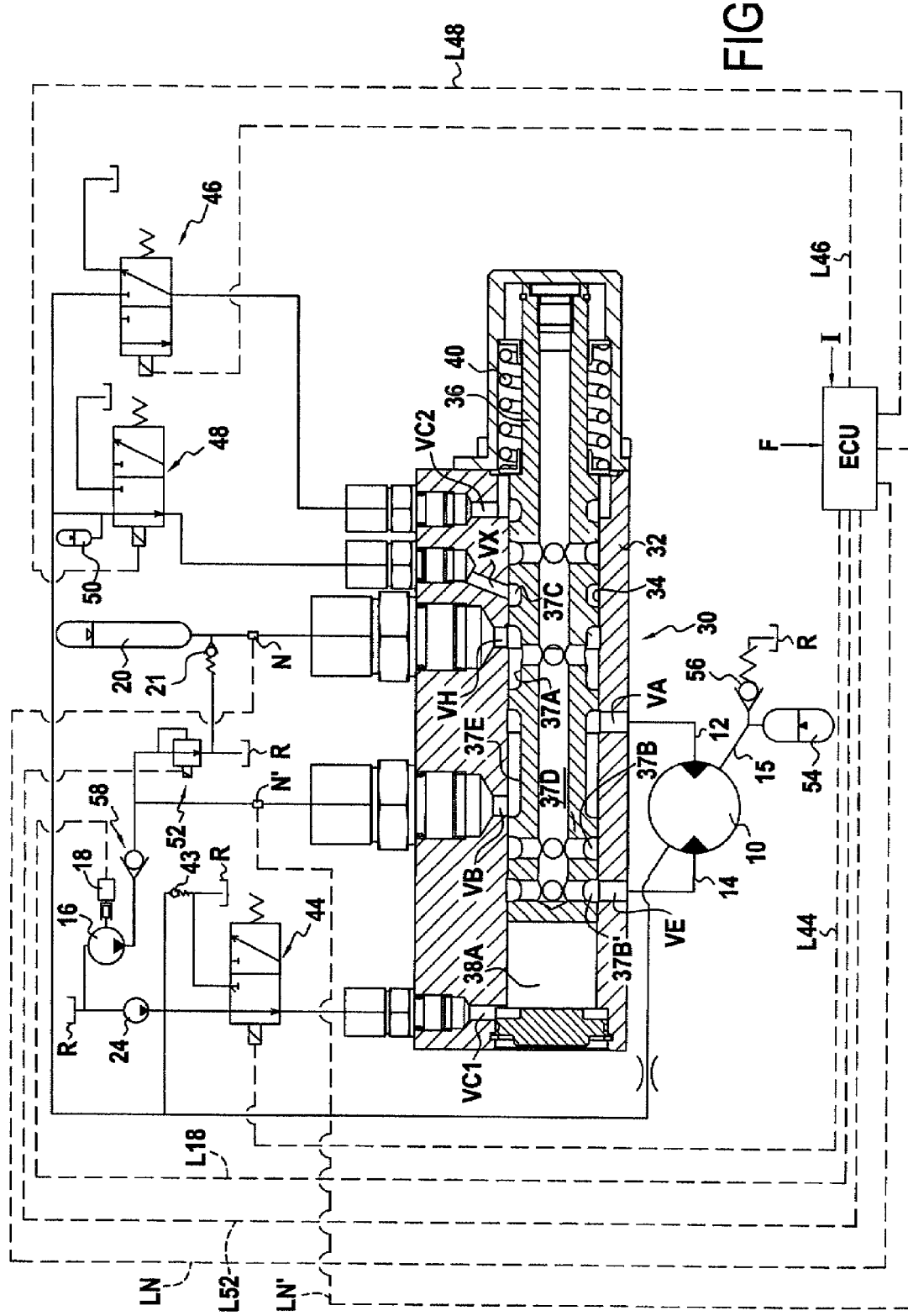
FIG. 1C shows this circuit in energy recovery mode.
Figure 1D:
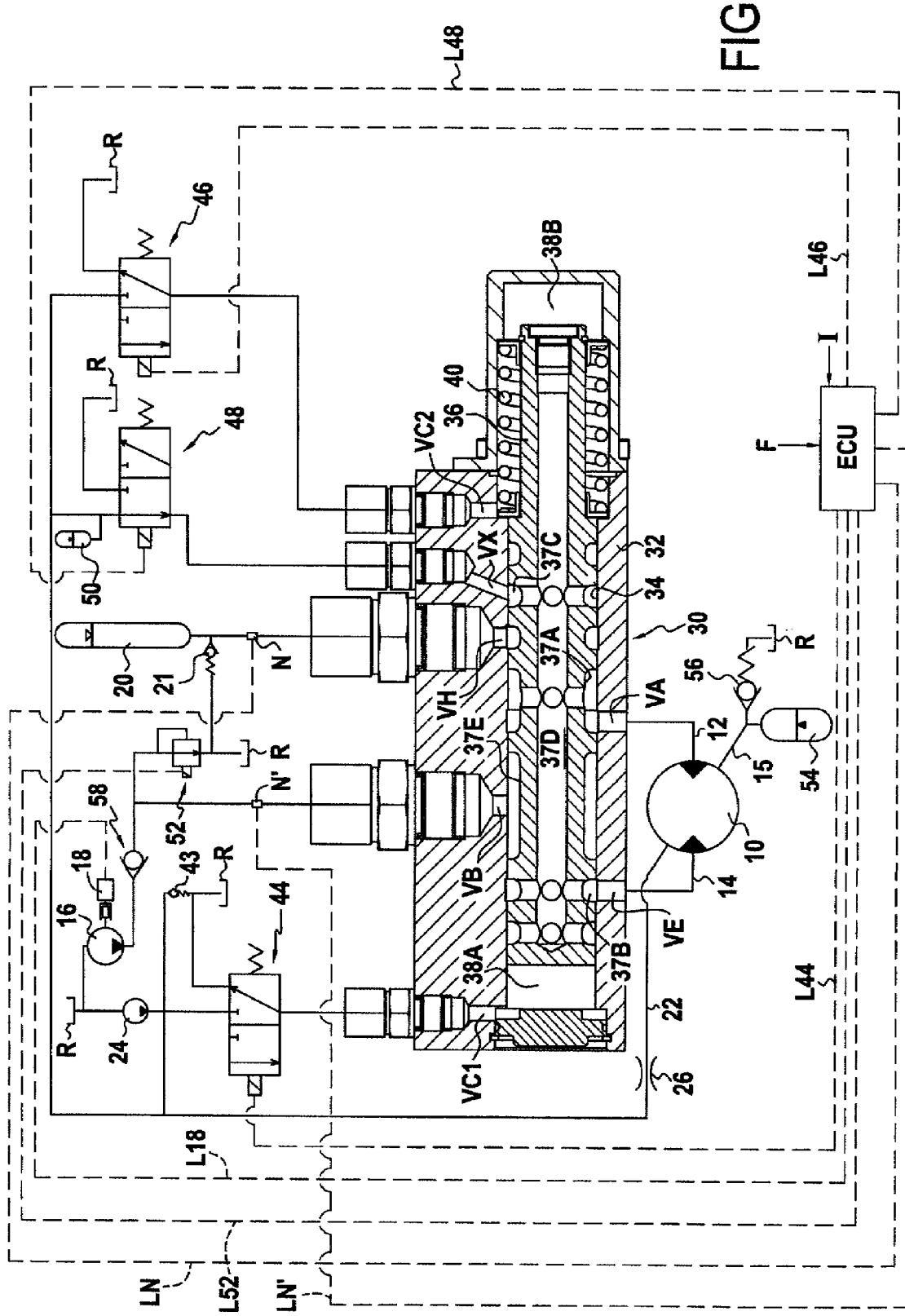
FIG. 1D shows this circuit at the end of an energy recovery phase, but before an energy delivery phase.
Figure 1E:
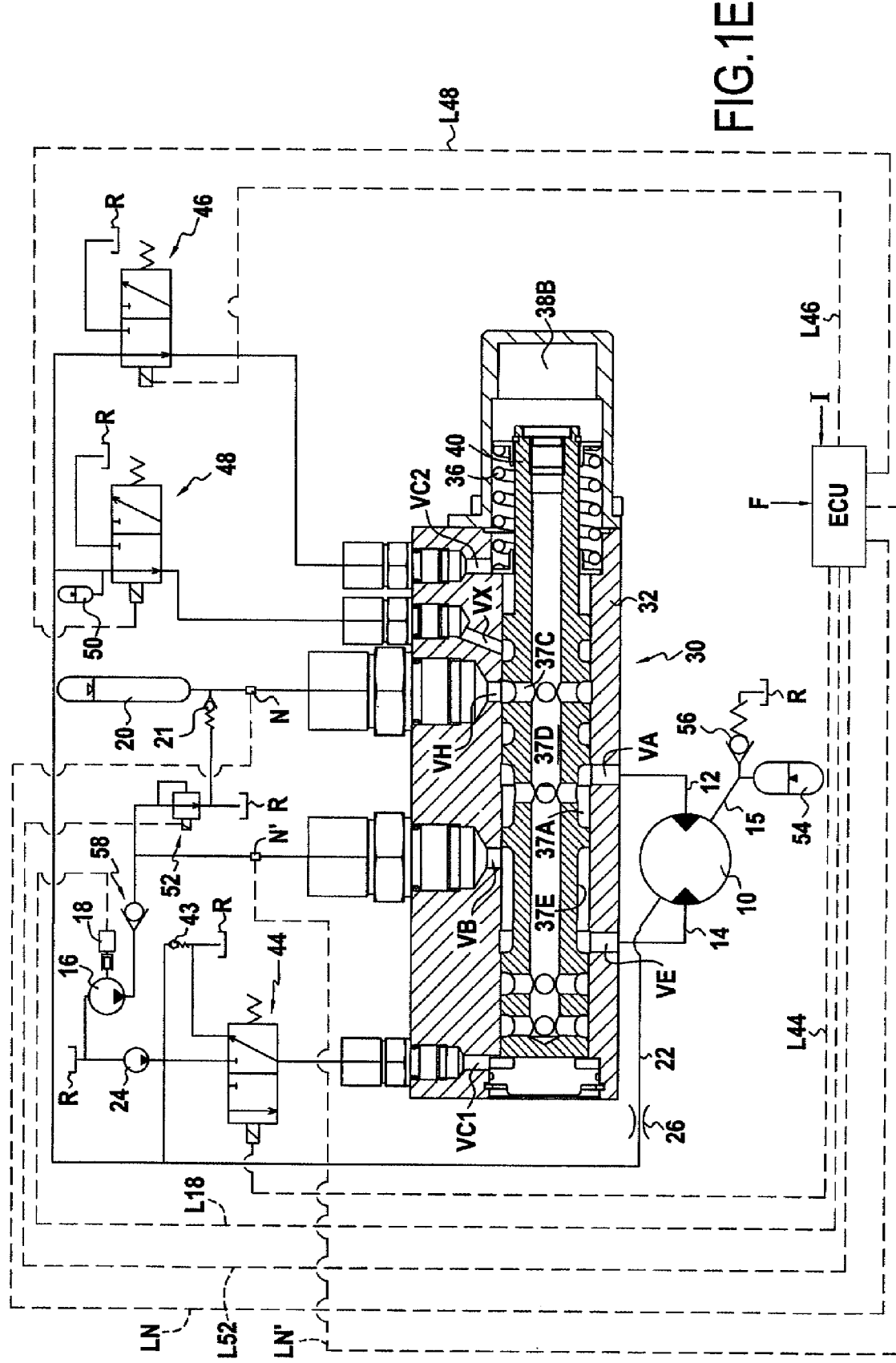
FIG. 1E shows this circuit during the energy delivery phase.
Figure 2A:
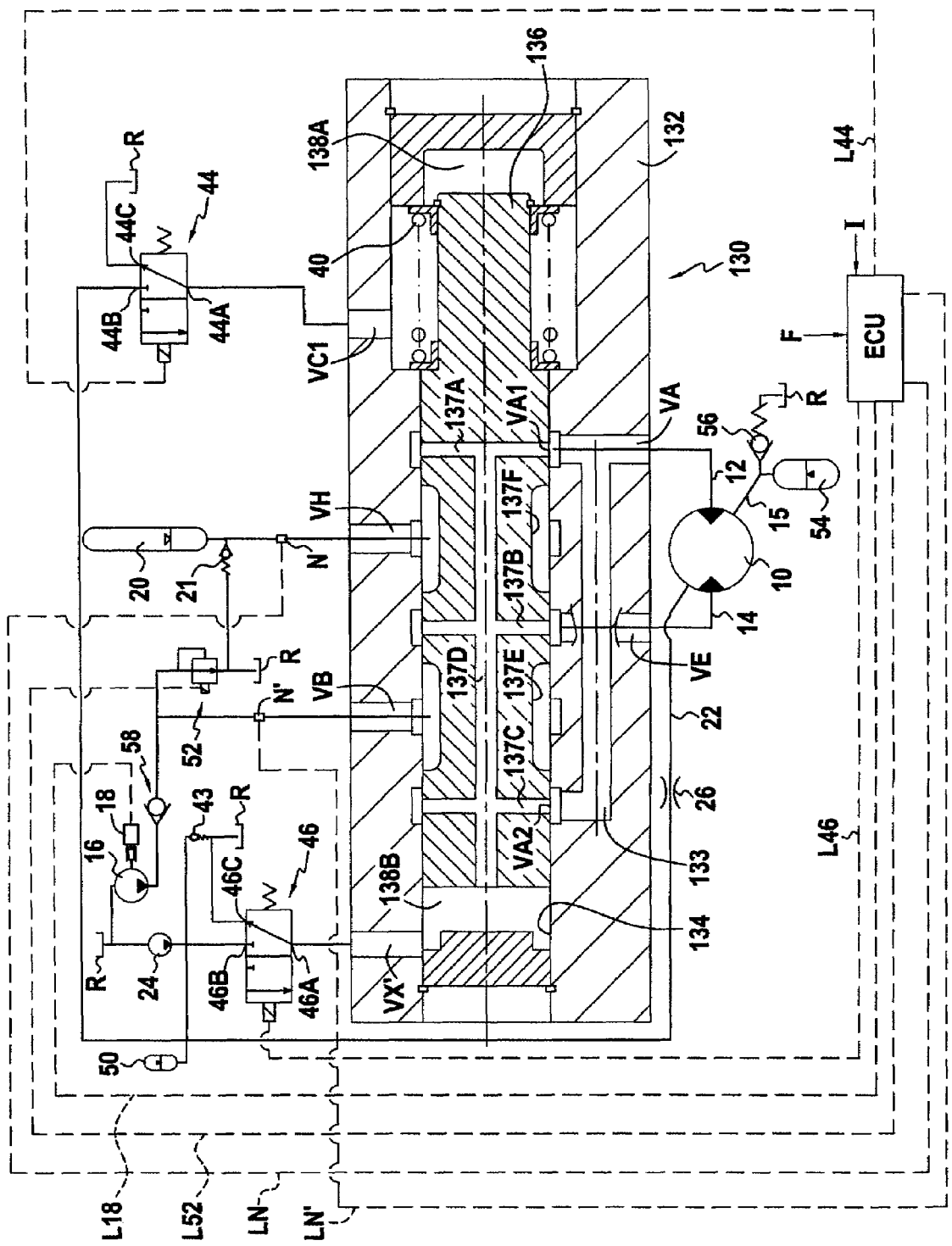
FIG. 2A shows a second embodiment of a circuit, in a standby configuration.
Figure 2B:
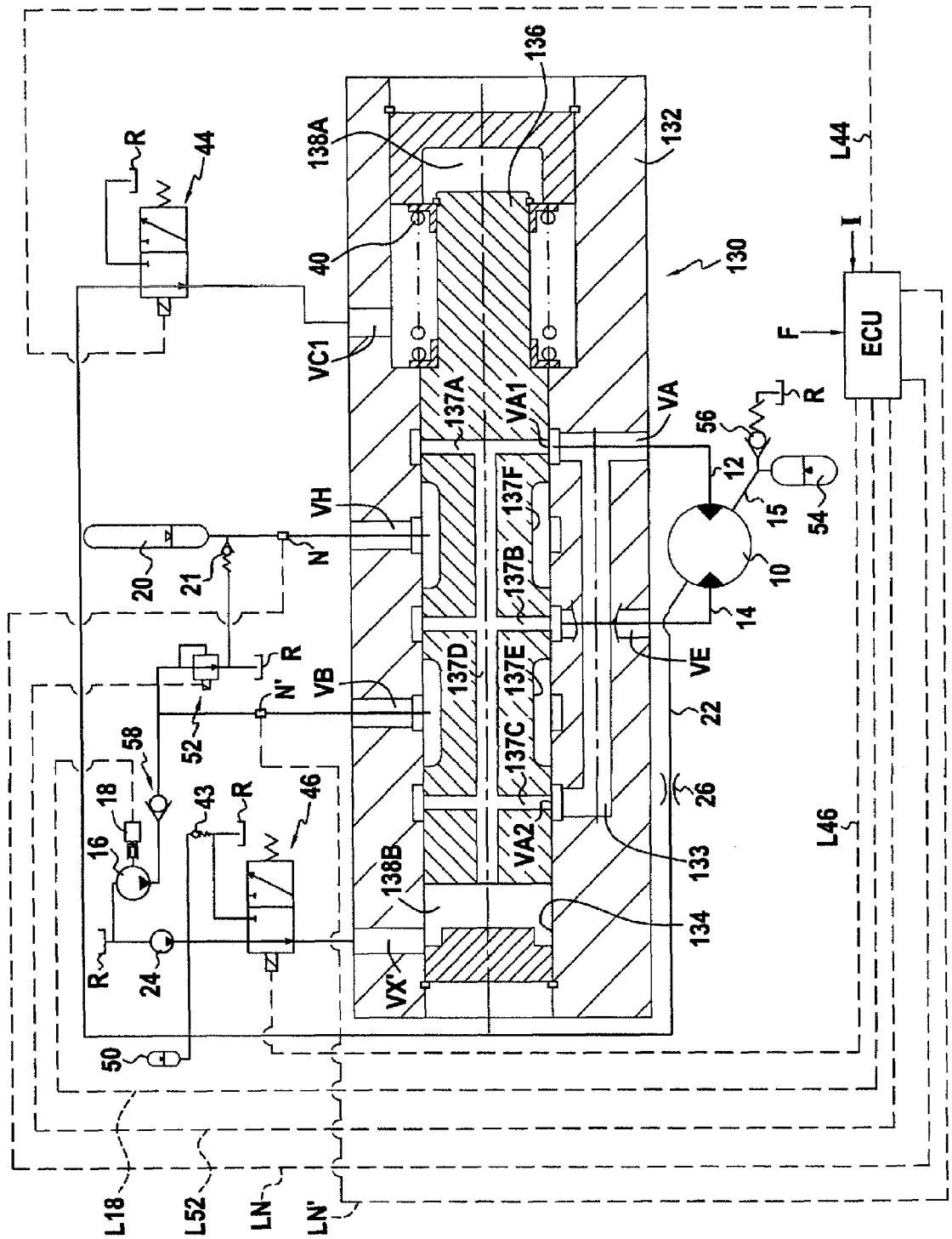
Figure 2C:
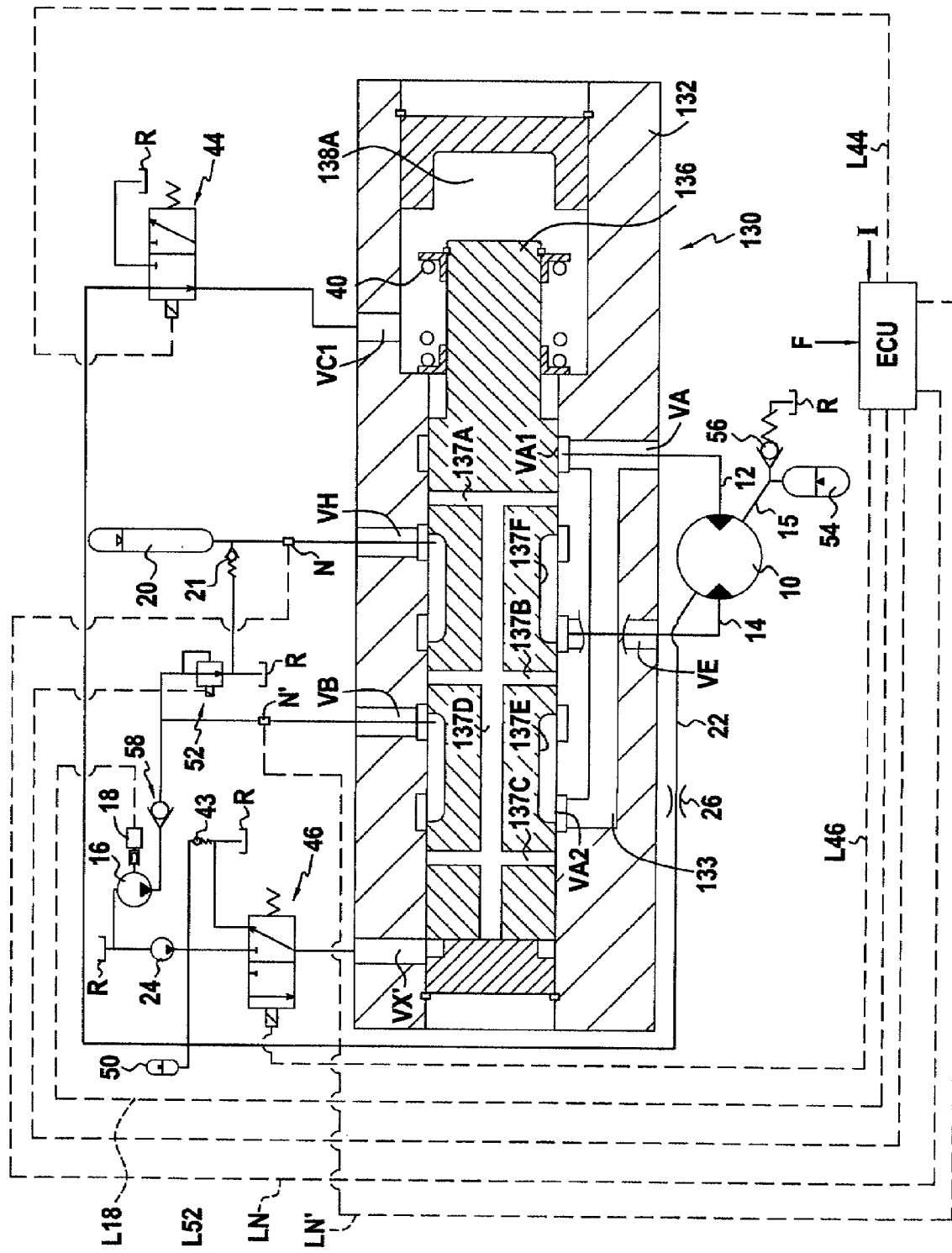
Figure 2D:
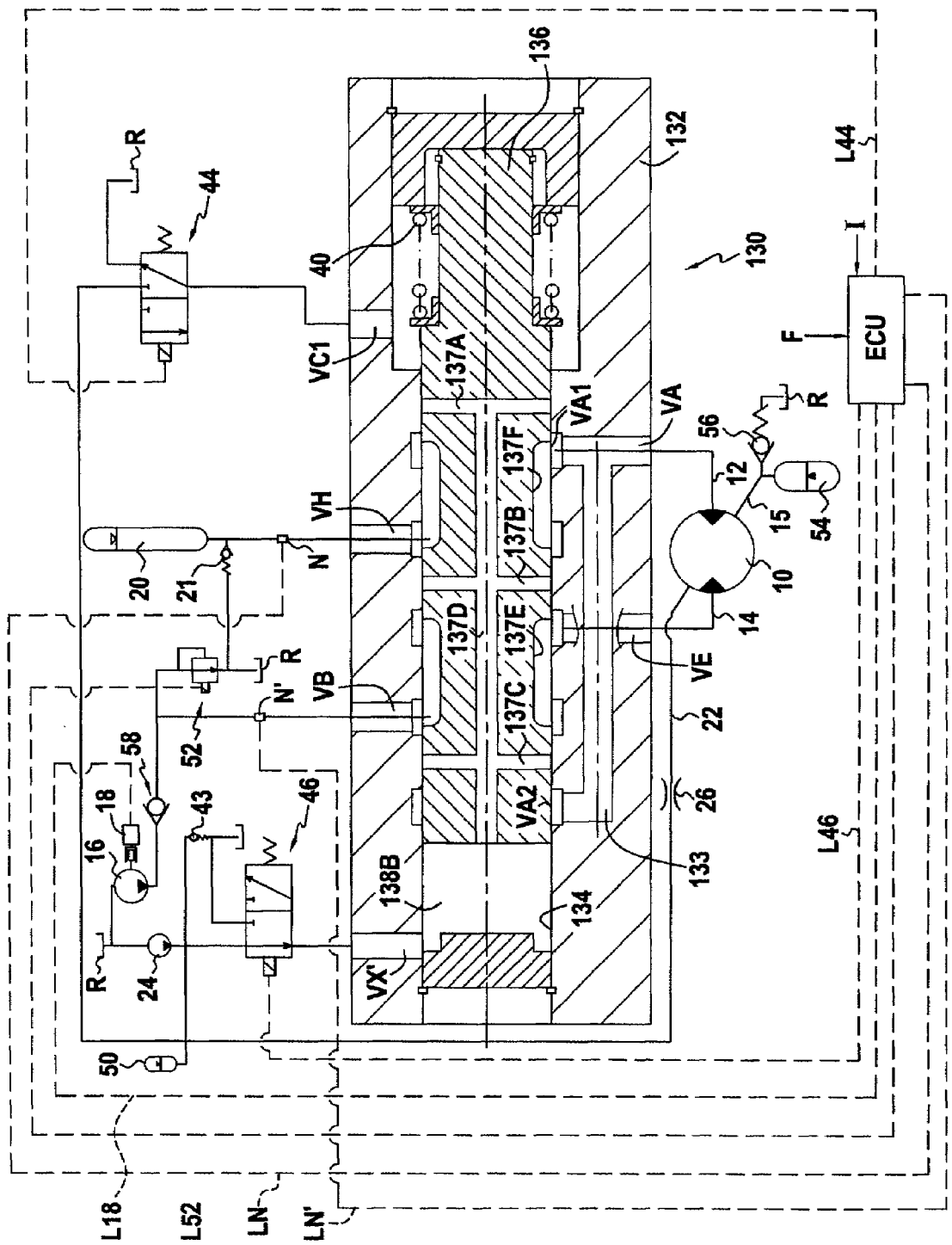
Figure 3A:
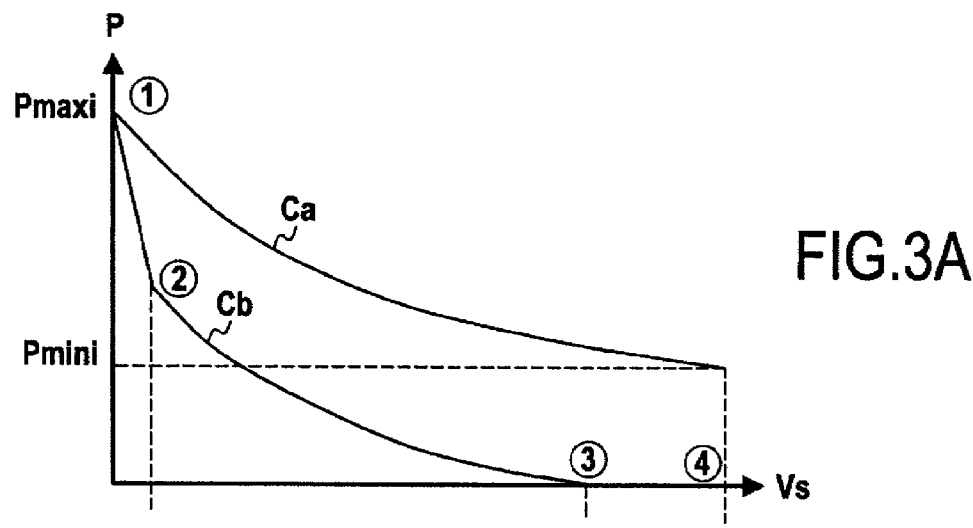
Figure 3B:
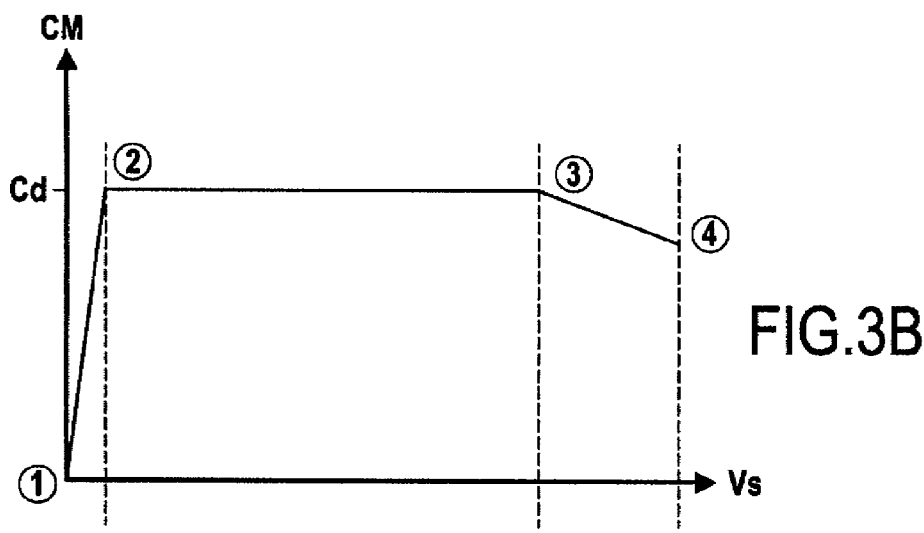
Figure 3C:
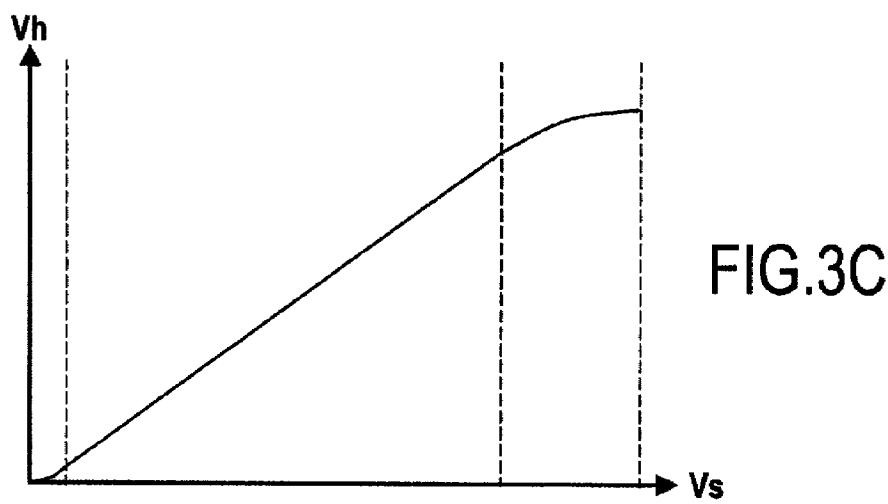
Figure 4A:
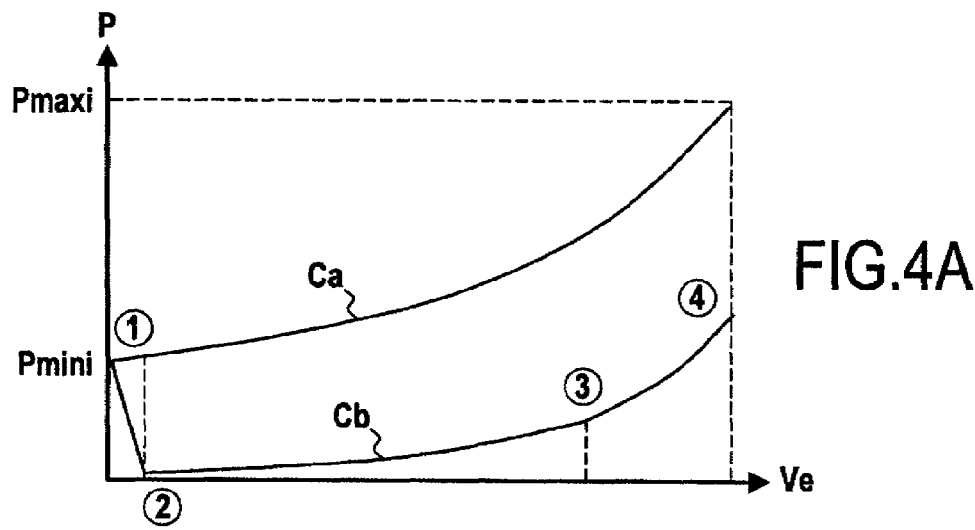
Figure 4B:
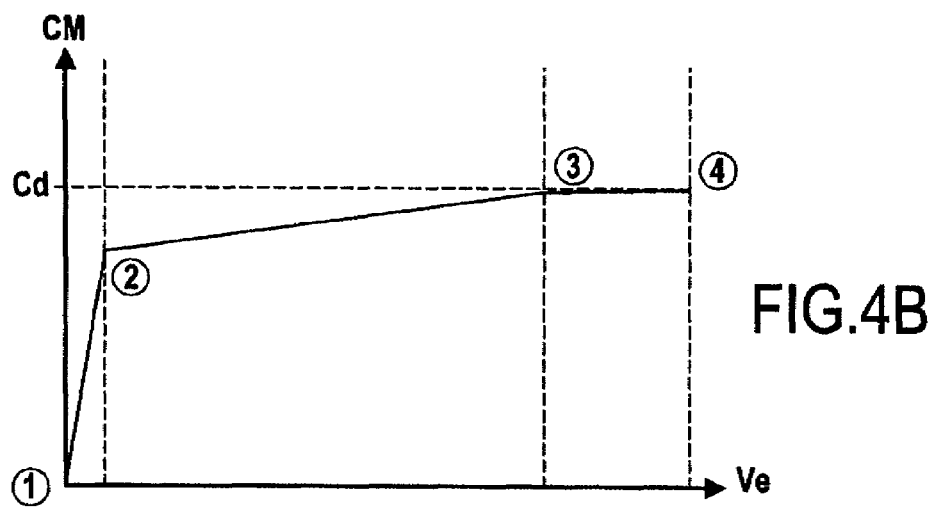
Figure 4C:
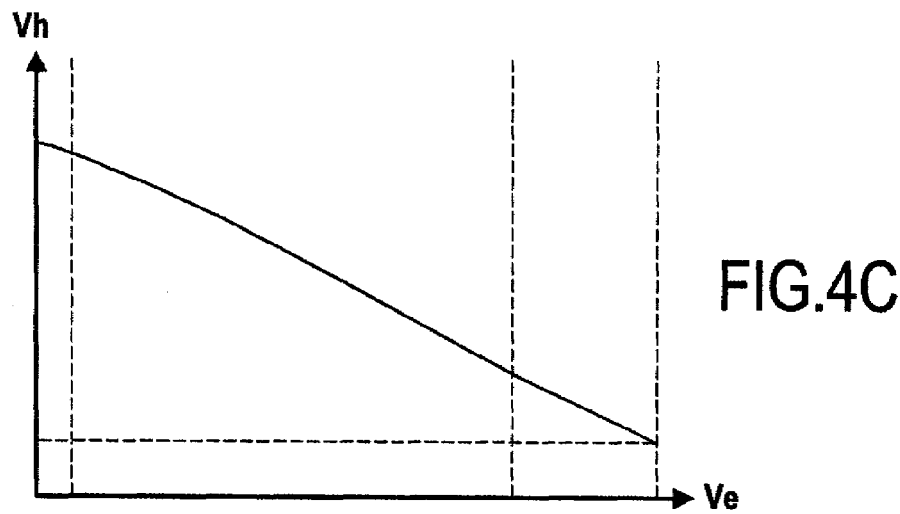

FIGS. 2B, 2C, and 2D show the circuit in situations corresponding respectively to the situations shown in FIGS. 1B, 1C, and 1E;

FIGS. 3A, 3B, and 3C show the variations in pressure, in torque, and in speed during energy delivery; and FIGS. 4A, 4B, and 4C are analogous to FIGS. 3A, 3B, and 3C, for energy recovery.

DETAILED DESCRIPTION OF THE PREFERRED EMBODIMENTS

The circuit shown in FIGS. 1A to 1E includes a hydraulic motor 10 with two main ducts, respectively 12 and 14, for feeding fluid to said motor and for discharging fluid therefrom. It also includes a low-pressure fluid source 16 formed by a high-flow-rate booster pump, which pumps the fluid from a pressure-free reservoir R (a reservoir at atmospheric pressure). Said pump is chosen to be suitable for delivering a flow rate of fluid that is sufficient to feed fluid to the hydraulic motor while said motor is at maximum speed, in the energy recovery configuration. If a plurality of motors are present in the circuit, the same high-flow-rate booster pump is advantageously used, which booster pump is dimensioned to deliver the flow rate of fluid that is sufficient to feed the various motors without cavitation when said motors are at maximum speed in this configuration.

The pump 16 is driven by an engine that can be the conventional propulsion engine of the vehicle. Means are provided for activating or deactivating the pump 16. In this example, it is equipped with an electromagnetic clutch 18.

The circuit also includes a high-pressure fluid source, formed by an accumulator 20.

The motor 10 is of the clutchable and declutchable type. For example, it is a hydraulic motor having radial pistons and of fixed cubic capacity. In order to make it possible to go over to the declutched position, i.e. to urge the pistons of the motor back towards the end-walls of their cylinders, the internal space of the casing of the motor is put under pressure while the main ducts of the motor are connected to a pressure-free enclosure (reservoir), i.e. an enclosure having no extra pressure or having a pressure that is significantly lower than the pressure of the casing of the motor. For this purpose, a duct 22 connected to a pressure source opens out into the internal space of the casing. In this example, the pressure source used is a pump 24 which, as is explained below, is also the clutch fluid source, to which the internal space of the casing of the motor is connected via a constriction 26 disposed in the duct 22.

The circuit includes a hydraulic valve 30 that comprises a valve body 32 having an internal bore 34 inside which a slide 36 is slidably mounted.

The valve body 32 has a feed port VA connected to the feed main duct 12, a discharge port VE connected to the discharge main duct 14, a low-pressure link port VB connected to the low-pressure fluid source 16, a high-pressure link port VH connected to the high-pressure accumulator 20, and an auxiliary port VX that is connected to an auxiliary duct. The hydraulic valve 30 also comprises a first control chamber 38A connected to a first control port VC1 and a second control chamber 38B connected to a second control port VC2.

In FIG. 1A, the slide 36 is shown in its neutral position, into which it is urged back continuously by a spring 40, so that the slide takes up its neutral position when the fluid pressures in the control chambers 38A and 38B are equal or substantially equal.

Thus, when the slide is in the neutral position, as shown in FIGS. 1A, 1B, and 1D, the slide is in the central position in the valve body 32. In the energy recovery configuration shown in FIG. 1C, the slide has been moved into a first end position (rightwards in this example) by increasing the pressure in the control chamber 38A, whose volume has increased.

Conversely, in the energy delivery configuration shown in FIG. 1E, the slide has been moved into its other end position (leftwards in this example) by feeding fluid to the control chamber 38B, whose volume has increased.

Solenoid valve means cause the slide to be moved and the hydraulic motor to be clutched/declutched.

In this example, in a first embodiment of the invention, said solenoid valve means include a first pilot solenoid valve 44 having a first port 44A connected to the first control port VC1, a second port 44B connected to the pump 24, and a third port 44C connected to the reservoir R. When it is in its rest position shown in FIG. 1A, its ports 44A and 44C are interconnected, so that the first control chamber 38A is connected to the reservoir R, while the port 44B is isolated.

On receiving a first control signal issued into a line L44 by an electronic control unit ECU, the solenoid valve 44 goes into its activated position, in which the ports 44B and 44A are interconnected while the port 44C is isolated, so that the control chamber 38A is fed with the pressurized fluid coming from the pump 24. Thus, the slide goes into its first end position shown in FIG. 1C.

The solenoid valve means also include a second pilot solenoid valve 46 that has a first port 46A connected to the second control port VC2, a second port 46B connected to the pump 24, and a third port 46C connected to the reservoir R.

When the solenoid valve 46 is in the rest position shown in FIG. 1A, the ports 46A and 46C are interconnected, so that the second control chamber 38B is connected to the reservoir R. On receiving a second control signal issued into a control line L46 by the unit ECU, the valve 46 takes up its activated position in which the ports 46A and 46B are interconnected, so that the chamber 38B can be fed with fluid by the pump 24. Thus, the slide goes into its second end position shown in FIG. 1E.

The circuit also includes a declutching solenoid valve 48 that has a first port 48A connected to the auxiliary port VX of the valve 30, a second port 48B connected to the pump 24, and a third port 48C connected to the reservoir R. When the valve 48 is in the declutching position which, in this example, is its rest position, the ports 48A and 48C are interconnected while being isolated from the port 48B, so that the auxiliary port VX of the valve 38 is connected to the reservoir. When the solenoid valve 48 is in the clutching position which, in this example, is its activated position into which it is caused to go by a control signal issued by the unit ECU into the control line L48, its ports 48A and 48B are interconnected, so that the auxiliary port VX of the valve 30 is connected to the pump 24.

Advantageously, in order to reduce the motor clutching time, a low-capacity (and therefore compact) accumulator 50 is disposed on a branch off the connection between the pump 24 and the ports 44B, 46B, and 48B of said valves.

It can be understood that, in the circuit shown, the pump 24 serves both to cause the slide 36 to move and so as to cause the motor 10 to be clutched/declutched.

Any excess pressure in the accumulator 20 can be relieved into the reservoir R, to which said accumulator is connected via a pressure limiter 21.

As indicated above, the high-flow-rate pump 16 is equipped with an electromagnetic clutch 18 that makes it possible to activate the pump only when necessary, in particular during an energy recovery phase. The clutch 18 is controlled by a control signal issued by the unit ECU into the control line L18. Therefore, the pump does not operate unnecessarily, which makes it possible to save energy.

The circuit includes an adjustable pressure limiter 52 for varying the pressure in the low-pressure link port VB. In this example, said pressure limiter 52 is disposed on a link between the delivery orifice of the pump 16 and the reservoir R. This adjustable pressure limiter is, in this example, electrically controlled, the limiter 52 being of the solenoid valve type and being connected to the control unit ECU via a control line L52.

During the energy recovery phase, the low-pressure link port VB serves to feed the motor 10 and it is then desirable to adjust the pressure at the outlet of the pump 16 to a level necessary for feeding the hydraulic motor (s) without cavitation. Conversely, during the energy delivery phase, the link port VB, which is connected to the discharge of the motor, has to remove the fluid towards the pressure-free reservoir and it is then preferable for the pressure limiter 52 to be adjusted to a minimum pressure level, or even to zero pressure. Preferably, during said energy delivery phase, the pump 16 is deactivated and a check valve 58 prevents the fluid delivered by the motor 10 from returning towards the pump 16 so that the adjustment of the low pressure is performed by the limiter 58.

The internal space of the casing of the motor 10 is connected to a secondary accumulator 54 of low capacity that makes it possible to keep, on standby, a fluid pressure that is sufficient for rapidly declutching the motor 10 whenever necessary. This link is implemented via a leakage return duct of the motor, on which duct a pressure limiter 56 is disposed, downstream from the connection point at which the accumulator 54 is connected to said duct 15.

It can be seen that, in conventional manner, a pressure limiter 43 is connected to the outlet of the pump 24. It makes it possible to define the clutch and pilot pressure.

The circuit operates as follows.

When the circuit is in a standby configuration, shown in FIG. 1A, the slide 36 of the valve 30 is in its neutral position: no control signal has been issued to the valves 44 and 46 that are in their respective rest positions, so that the control chambers 38A and 38B are not put under pressure and so that the neutral position is obtained by the return effect of the spring 40.

The feed port VA, the discharge port VE, and the auxiliary port VX communicate with one another via grooves 37A, 37B, and 37C and via an axial hole 37D in the slide. A fourth groove 37E of the slide is isolated from the preceding grooves, and isolates the port VB from the other ports.

The electronic control unit ECU is informed of the conditions of operation of the vehicle, in particular of a deceleration or of an acceleration thereof, and thus of a need for energy recovery or for energy delivery, by an item of information I. When this information indicates a deceleration suitable for enabling energy to be recovered, the unit ECU issues a clutching signal into the line L48 and thus causes the solenoid valve 48 to go into its activated position, thereby enabling the auxiliary port VX to be fed with fluid. The feed and discharge main ducts 12 and 14 of the motor are then put at the same pressure (so that the motor does not yet generate any significant torque) but this pressure delivered by the pump 24 and possibly by the accumulator 50, is sufficiently higher than the pressure prevailing in the casing of the motor to push the pistons of the motor back against the cam thereof. The motor is then clutched.

FIG. 1B shows the situation during clutching of the motor. It can be seen that the slide remains its neutral position, without modifying the interconnection between the ports VA, VE, and VX, or the isolation of the port VB, but that the solenoid valve 48 is in its clutching position.

In order to make the energy recovery phase possible that consists in feeding the accumulator 20 by the rotation of the motor 10 that is operating as a pump, it is necessary for the pump 16 to be activated by its clutch 18, in particular by a clutching control signal issued by the electronic control unit ECU into the line L18.

With the motor being clutched, and the pump being activated, the electronic control unit ECU issues a first control signal into the line L44 for causing the solenoid valve 44 to go into its activated position, so as to cause the slide to move into its first end position by feeding the control chamber 38A.

This is the situation shown in FIG. 1C. It can be seen that the ports VA and VB of the valve 30 are then interconnected via the groove 37E of the slide 36 while being isolated from the other ports. The port VE is connected to the port VH via the groove 37'B of the slide, via its central hole 37D, and via the groove 37A. The port VX is isolated from the other ports.

The adjustable pressure limiter 52 is then set to the desired level. This adjustment is described in detail below in the description of FIG. 4A. For example, the level is the level obtained by a control signal for controlling the pressure limiter 52 being issued into the line L52 by the unit ECU. In this situation, the motor 10 is driven in rotation by being mechanically coupled to the propulsion of the vehicle, and it operates as a pump by feeding the high-pressure accumulator 20 with fluid coming from the pump 16. These recharging needs are known by the ECU, since a pressure sensor N detects the level of pressure in the accumulator 20, i.e. the level of charge thereof, and that information is transmitted to the unit ECU via a line LN.

The unit ECU can be parameterized so that, during an energy recovery phase, it guarantees that the difference between the high pressure of the accumulator 20 and the low pressure delivered by the pump 16 remains constant, so as to obtain constant hydrostatic braking torque, or else it guarantees that said difference varies in compliance with a determined variation relationship, as a function of the real hydrostatic braking torque needs, in particular by delivering hydrostatic braking torque that is lower towards the end of a deceleration phase.

The energy recovery phase can continue throughout the deceleration or, if a maximum level of charge of the accumulator 20 is detected by the sensor N, the energy recovery phase can terminate before the end of the deceleration. Other types of information can indicate the end of the energy recovery phase, such as, for example, opening of the pressure limiter 21.

Once the energy recovery phase is terminated, the control signal in the line L44 ceases, so that the solenoid valve 44 returns to its rest position, thereby connecting the first chamber 38A to the reservoir R. The slide 36 then returns to its neutral position, and the configuration shown in FIG. 1D is obtained, that configuration being analogous to the configuration shown in FIG. 1B except that the level of fluid in the accumulator 20 has increased.

The configuration of FIG. 1D corresponds to a balancing phase, during which the main ducts 12 and 14 of the motor communicate with each other. The solenoid valve 48 can remain in its clutching position during a first period of said balancing phase, so as to maintain the motor clutched, in order to make it possible to go very rapidly into an energy delivery phase if necessary or so as to resume an energy recovery phase if braking resumes. In order to declutch the motor, it suffices for the clutching signal to cease, thereby enabling the solenoid valve 48 to go over to its configuration corresponding to declutching, in which configuration the auxiliary port VX is connected to the reservoir R.

When the motor is clutched, so as to go over to the energy delivery phase, it suffices for a second control signal to be issued into the line L46 in order to go over to the energy delivery phase. The circuit is then in the configuration shown in FIG. 1E, in which it can be seen that the solenoid valve 46 is in its activated position, thereby enabling the control chamber 38B to be fed with fluid, thereby moving the slide 36 into its second end position.

When the slide is in this position, the feed port VA and the high-pressure port VH of the valve 30 are interconnected via the groove 37A, via the hole 37D, and via the groove 37C of the slide 36, while being isolated from the other ports. The discharge port VE and the low-pressure port VB are interconnected via the groove 37E of the slide while being isolated from the other grooves, and the auxiliary port VX is isolated from the other grooves. During this energy delivery phase, the motor 10, fed by the high pressure coming from the accumulator 20, participates in delivering the drive for the vehicle. This makes it possible in particular to make energy savings when switching on the propulsion engine after it has been switched off, or when accelerating at low speed. The end of the energy delivery phase is established by the unit ECU, e.g. when the information I that is transmitted to it indicates that the vehicle has reached a sufficient speed or when the acceleration ceases. The energy delivery phase is also stopped when the accumulator 20 no longer has sufficient fluid pressure, in particular when the sensor N indicates a low pressure level in said accumulator.

In order to deliver maximum hydraulic assistance drive torque, the pressure limiter 52 is set to a minimum, or even zero, pressure, this setting being obtained, for example, when the signal in the line L52 ceases. It should also be noted that the pressure limiter 52 is advantageously set to the minimum pressure level as of the beginning of the balancing phase or, at least, as of the end of the first period of said balancing phase. In order to minimize the low pressure during the acceleration phase, the pump 16 can be deactivated, by a suitable control instruction or by absence of a control signal in the control line L18. The low pressure is then set only by the pressure limiter 52.

It should be noted that the information I received by the unit ECU can relate to the operating conditions of the vehicle fitted with the circuit, making it possible for the unit ECU to determine an operating setpoint for the hydraulic motor(s) and to control the pressure limiter 52 correspondingly so as to obtain the desired low pressure. For example, it can be desired for the hydraulic motors to be powered up progressively in order to avoid jolts when activating the assistance. For example, the setpoint can take account of the desired acceleration level, indicated by the amplitude through which the accelerator pedal is depressed or by the amplitude through which an accelerator lever ("joystick") is moved, and of the speed of the vehicle.

The operating setpoint relates, in particular, to the outlet torque of the hydraulic motor(s), that it can be chosen to make progressive, by increasing it rapidly at the beginning of the energy delivery phase, by maintaining it at a stabilized level during the core of the phase, and by decreasing it towards the end of said phase.

In order to servo-control the pressure limiter 52, the level of the effective low pressure can be detected by a sensor N' and transmitted to the unit ECU via a line LN'.

A description follows of FIGS. 2A to 2D, in which the elements that are unchanged relative to FIGS. 1A to 1E are designated by like references in the drawings.

In the valve 130, the same port VX' is both the auxiliary port and the second control port that feeds the control chamber 138B (it could be the port that feeds the chamber 138A). By means of a hole 133 in the body 132 of the valve 130, its port VA opens out into its bore 134 at two distinct locations, respectively VA1 and VA2, spaced apart from each other in the direction in which the slide moves. Said slide has three transverse holes 137A, 137B, and 137C that are connected together via a blind hole 137D that opens out into the chamber 138B. This hole opens out into the chamber (chamber 138B in this example) to which the auxiliary port is connected.

The first ports 44A and 46A of the valves 44 and 46 are connected to respective ones of the control chambers 138A and 138B.

In FIG. 2A, the slide is in its neutral position and it can be seen that the ports VA and VE communicate with each other and with the port VX', via the holes 137A to 137D in the slide. Insofar as the solenoid valve 46 is then in its neutral position, in which it connects the port VX' to the reservoir R, the main ducts 12 and 14 of the motor 10 are then connected to the reservoir, so that the motor is declutched.

The selection signal making it possible to clutch the motor 10 consists in the first control signals respectively issued into the lines L44 and L46 by the unit ECU for causing the two solenoid valves 44 and 46 to go into their activated positions. In this situation, both of the control chambers 138A and 138B are connected to the outlet of the pump 24, so that the pressures in these two chambers are the same, and so that the slide remains in its neutral position, into which it is continuously urged to return by the spring 40. However, insofar as, in this situation, the auxiliary port VX' that also serves as a control port for feeding the chamber 138B is connected to the outlet of the pump 24, the common pressure in the ducts 12 and 14 of the motor increases, thereby making it possible to clutch the motor. This is the situation shown in FIG. 2B.

In order to go from this situation to the energy recovery situation, the first control signal continues to be issued into the control line L44, so that the first control chamber 138A continues to be fed with fluid, but the control signal ceases to be issued into the line L46 so that the valve 46 returns to its rest position, in which it connects the port VX' and thus the second control chamber 138B to the reservoir R. In this situation, the slide is caused to go into its first end position (leftwards, in this example). In this situation, the feed port VA is connected to the low-pressure port VB, via the groove 137E of the slide 136 that is in register both with the orifice VA2 of the port VA and with the port VB. These ports VA and VB are isolated from the other ports. The port VE is connected to the port VH via the groove 137F of the slide. The port VX' is isolated from the other ports. This is the situation that is shown in FIG. 2C.

In order to keep the motor clutched at the beginning of the balancing phase, the unit ECU issues a control signal again into the line L46, thereby activating the solenoid valve 46 and thereby also feeding the chamber 138B from the pump 24, thus putting this chamber at the same pressure as the chamber 138A. The situation is then the same as in FIG. 2B, except that the fluid level in the accumulator 20 has increased. In order to declutch the motor, the unit ECU ceases to issue control signals into the lines L44 and L46, so that the valves 44 and 46 return to their neutral positions, thus returning to the configuration in FIG. 2A, in which configuration the feed and discharge ducts 12 and 14 are connected to the reservoir.

The energy delivery phase is performed by putting the circuit in the configuration shown in FIG. 2D, obtained by placing only the valve 46 in its active position, so that only the control chamber 138B is fed with fluid, via the port VX', and so that the slide is moved into its second end position (rightwards, in this example).

When the slide is in this position, the port VA communicates with the port VH via the groove 137F of the slide, which groove is register both with the port VH and the with the first orifice VA1 of the port VA. The second orifice of this port is closed off by the slide. The port VE communicates with the port VB via the groove 137E that is in register with these two ports, while the port VX' is isolated from the other ports.

With the circuit of FIGS. 2A to 2D, it is thus possible to obtain the same configurations as with the circuit of FIGS. 1A to 1E while omitting the solenoid valve 48, because the motor is caused to be clutched or declutched using the solenoid valve 46.

The electronic control unit ECU is suitable for receiving the information from the various sensors. In particular, the information I that enables it to trigger the energy recovery and energy delivery phases can be based on the measurements of various sensors, relating in particular to levels of braking or of acceleration of the vehicle, for sensing the drive torque delivered by the main propulsion means, on the basis of which measurements and on the basis of calculations and comparisons with recorded data, the unit ECU determines the need to trigger these phases and the desired low-pressure level, so as to adjust the pressure limiter 52 correspondingly. As indicated above, the level of charge of the accumulator 20 is advantageously also taken into account in this determination, in order to avoid, in particular, triggering an energy recovery phase when the charge is at its maximum. The unit ECU includes any memory zone and any computer or comparator means that are suitable for performing its functions. The links between the unit ECU and the various sensors from which it receives the data, and between said unit and the various members that it controls can be wired or wireless links.

FIGS. 3A, 3B, and 3C show, by way of example, the variations in pressure P, in outlet torque CM from the hydraulic motor(s), and in speed of the vehicle Vh, as a function of the cumulative volume Vs output from the accumulator for feeding the hydraulic motor(s), during an energy delivery phase.

In FIG. 3A, the curves Ca and Cb respectively show the variation of the high pressure in the accumulator 20 (feed pressure) and the variation of the low pressure set by the pressure limiter 52 (discharge pressure) as a function of the volume Vs. FIG. 3B shows the variation of the drive torque delivered by the hydraulic motor(s) as a function of said volume, and the curve of FIG. 3C shows the variation of the speed of the vehicle as a function of said volume. Said speed is set by a setpoint given by the driver (by the amplitude through which the accelerator pedal or lever of the vehicle moves). These curves are mutually adjusted to have the same abscissa values.

During said energy delivery phase, the pump 16 is declutched and the low pressure is set by controlling the pressure limiter 52.

It is observed that, during the energy delivery phase, the pressure in the accumulator (curve Ca) decreases as the accumulator discharges and as the speed Vh of the vehicle increases.

At stage 1 of the example in question, at the instant at which the energy delivery phase starts after an energy recovery phase has finished, the accumulator 20 is fully charged and its pressure is at its maximum (Pmaxi), so that the pressure in the feed duct 12 (connected to the outlet of said accumulator) is at said value Pmaxi. The limiter 52 is then adjusted so that the pressure in the discharge duct 14 (connected to the low-pressure fluid source) is also equal to or slightly less than the value Pmaxi. Thus, at this moment, the hydraulic assistance drive torque (that, it is recalled, is equal to the product of the difference between the pressures of the two ducts multiplied by the cubic capacity of the motor) is zero or low, in order to avoid jolts when the hydraulic assistance starts.

The pressure in the discharge duct then decreases very rapidly so as to increase the drive torque CM rapidly, as shown in FIG. 3B, until stage 2 at which the requested torque Cd that corresponds to the desired acceleration is reached.

This level of acceleration is then maintained until stage 3 by decreasing the discharge pressure in parallel with the decrease in pressure at the outlet of the accumulator so as to obtain, between the phases 2 and 3, drive torque that is substantially constant.

At stage 3, the pressure in the discharge duct has reached a minimum threshold at which it remains fixed. However, since the circuit remains in the energy delivery phase, the fluid continues to be taken from the accumulator and the feed pressure at the outlet of said accumulator thus decreases, so that the difference between the high pressure and the low pressure decreases, causing a reduction in the hydraulic assistance drive torque.

At stage 4, the pressure at the outlet of the accumulator has reached its threshold Pmini (the volume of fluid in the accumulator has reached its low level) and the hydraulic assistance drive torque has decreased sufficiently for the hydraulic assistance to be able to cease without giving rise to any jolting. To this end, it is possible to consider providing a very slight increase in the low pressure at the moment when the hydraulic assistance ceases.

FIGS. 4A, 4B, and 4C show, by way of example, the variations in the same magnitudes during an energy recovery phase, as a function of the cumulative volume Ve of fluid input into the accumulator 20, the outlet torque CM of the motor then being braking torque.

As shown in FIG. 4A, the pressure in the accumulator (curve Ca) is equal to its threshold Pmini at stage 1 which is the instant at which energy recovery starts, after an energy delivery phase has completely discharged the accumulator which has thus reached its minimum volume. At this stage, the pressure limiter 52 is adjusted so that the pressure at the outlet of the low-pressure fluid source is equal to or slightly less than Pmini, so that the braking torque of the hydraulic motor is zero or low, so as to avoid a braking jolt.

At the beginning of the energy recovery phase, the low pressure set by the pressure limiter 52 decreases rapidly until stage 2 (curve Cb) so as to enable the braking torque to increase rapidly. The low pressure level reached at stage 2 is the level necessary for boosting the motor without cavitation, while taking account of the speed of rotation of the motor at that moment, as determined by the propulsion of the vehicle. This low level is computed by the ECU as a function of the speed of the motor.

Between stages 2 and 3, the vehicle slows down, so that the speed of the hydraulic motor decreases. The boosting low pressure is set by the pressure limiter, to the level just sufficient to continue to avoid cavitation. Insofar as the accumulator 20 is being recharged, the high pressure of the curve Ca increases more rapidly than the low pressure of the curve Cb, so that the hydrostatic braking torque increases.

At stage 3, the desired braking level is reached and it is thus desired to stabilize the hydrostatic braking torque at the requested torque value Cd. For this purpose, between the stages 3 and 4, the low pressure delivered by the low-pressure fluid source is increased more rapidly (this increase becoming at least substantially equal to the increase in the pressure in the accumulator 20), and the hydrostatic braking torque stagnates at the required level.

At stage 4, the maximum pressure level is reached in the accumulator (Pmaxi) and the energy recovery can cease.

The invention claimed is:

1. A hydraulic circuit for recovering energy, which circuit comprises at least one hydraulic motor, two main ducts for feeding or discharging said at least one motor, a low-pressure fluid source, and a high-pressure accumulator forming a high-pressure fluid source, the circuit being suitable for operating in energy recovery mode in which the feed main duct is connected to the low-pressure fluid source and the discharge main duct is connected to the high-pressure accumulator, and in energy delivery mode in which the feed main duct is connected to the high-pressure accumulator and the discharge main duct is connected to the low-pressure fluid source, said low-pressure fluid source comprising a high-flow-rate booster pump suitable for delivering, from a pressure-free reservoir, a flow-rate of fluid that is sufficient to feed fluid to said at least one hydraulic motor while said motor is at maximum speed in energy recovery mode and an adjustable pressure limiter suitable for being controlled so as to cause the pressure of the fluid at the low-pressure fluid source to vary.

2. A circuit according to claim 1, wherein the high-flow-rate booster pump can be activated and deactivated.

3. A circuit according to claim 1, further comprising a detector for detecting at least one indicator parameter that indicates the state of the circuit, and a controller for controlling the adjustable pressure limiter as a function of said at least one parameter.

4. A circuit according to claim 3, wherein said at least one indicator parameter comprises the level of charge of the high-pressure accumulator.

5. A circuit according to claim 1, further comprising a controller for controlling the adjustable pressure limiter as a function of an operating setpoint for operation of said at least one hydraulic motor.

6. A circuit according to claim 5, wherein the operating setpoint relates to the outlet torque of said at least one motor.

7. A circuit according to claim 1, wherein the adjustable pressure limiter is electrically controlled.

8. A circuit according to claim 7, wherein the adjustable pressure limiter is a proportional pressure limiter.

9. A circuit according to claim 1, further comprising an electronic control unit suitable for controlling the adjustable pressure limiter for acting, in energy recovery mode, to set the outlet pressure of the low-pressure fluid source to a level necessary for feeding said at least one hydraulic motor without cavitation, and for acting, in energy delivery mode, to set said low pressure to a minimum level.

10. A circuit according to claim 1, further comprising an electronic control unit for controlling the adjustable pressure limiter, wherein an information relating to at least one indicator parameter that indicates the state of the circuit is transmitted to the electronic control unit, and said unit is suitable for determining control of the adjustable pressure limiter as a function of said information.

11. A circuit according to claim 10, wherein said at least one indicator parameter comprises the level of charge of the high-pressure accumulator.

12. A circuit according to claim 1, further comprising an electronic control unit for controlling the adjustable pressure limiter as a function of an operating setpoint for operation of said at least one hydraulic motor, the electronic control unit being suitable for determining said operating setpoint as a function of operating conditions of a vehicle fitted with the circuit, and for determining control of the adjustable pressure limiter as a function of said setpoint.

13. A circuit according to claim 1, wherein the hydraulic motor has a fixed cubic capacity and the adjustable pressure limiter is controlled so as to vary a torque of the hydraulic motor.

14. A circuit according to claim 1, wherein the adjustable pressure limiter is a proportional pressure limiter.

* * * * *